United States Patent

Gunjishima et al.

Patent Number: 5,199,975
Date of Patent: Apr. 6, 1993

[54] METHOD FOR PROCESSING USED BATTERY

[75] Inventors: Hisashi Gunjishima, Ushiku; Junichiro Tanaka; Masaharu Onoue, both of Shimonoseki, all of Japan

[73] Assignee: Mitsui Mining & Smelting Company, Ltd., Tokyo, Japan

[21] Appl. No.: 847,198

[22] Filed: Mar. 6, 1992

Related U.S. Application Data

[63] Continuation-in-part of Ser. No. 760,759, Sep. 16, 1991, abandoned.

[30] Foreign Application Priority Data

Sep. 19, 1990 [JP] Japan .................................. 2-247355
Jul. 1, 1991 [JP] Japan .................................. 3-159373

[51] Int. Cl.⁵ .............................................. C22B 7/00
[52] U.S. Cl. .................................... 75/669; 75/401; 75/693
[58] Field of Search .................... 75/401, 669, 693

[56] References Cited

U.S. PATENT DOCUMENTS 2,891,881  6/1959  Jaffe ........................ 75/401
3,558,304  1/1971  McIntyre ................. 75/401

Primary Examiner—Peter D. Rosenberg
Attorney, Agent, or Firm—Bierman and Muserlian

[57] ABSTRACT

The invention relates to a method for recovering cadmium in used nickel-cadmium batteries by heat treatment. According to the invention, a plastic case for a battery can be separated from a battery body easily without leaking cadmium. High purity cadmium can be recovered by volatilizing cadmium in a non-oxidizing atmosphere.

13 Claims, 3 Drawing Sheets

FIG. I

METHOD FOR PROCESSING USED BATTERY

PRIOR APPLICATION

This application is a continuation-in-part of U.S. Pat. application Ser. No. 760,759 filed Sept. 16, 1991, now abandoned.

FIELD OF THE INVENTION

The present invention relates to a method for processing a used battery by efficiently recovering high purity cadmium from a used nickel-cadmium battery.

BACKGROUND OF THE INVENTION

Recently, demand of nickel-cadmium battery (hereinafter, it is also referred to Ni-Cd battery) has remarkably increased as a superior battery accumulator. Lifetime of such a Ni-Cd battery is about several years. Among the Ni-Cd batteries, Ni-Cd batteries for industrial use having relatively large size are broken into pieces and an anode electrode (Ni) and a cathode electrode (Cd) of the Ni-Cd batteries are separated from each other. Ni and Cd can be recovered by a wet method or a dry method.

On the other hand, Ni-Cd batteries for private use of a relatively small size are disposed by earth filling and so which the battery is installed in an equipment, or the battery is merely detached. Such a condition is not preferable because of environmental pollution and resource recycling. Particularly, it will become an important problem of recycling the Ni-Cd batteries having relatively small size in the future.

Japanese Patent Laid-open Publication No. 152138/1980 discloses a method for recycling Ni-Cd batteries wherein an outer shell portion of a used nickel-cadmium battery is partly opened in order to expose the battery body and then the nickel-cadmium battery is heat treated at 700° to 1000° C. in a non-oxidizing atmosphere in order to collect volatile cadmium.

Presently, batteries of size D (32 diameter×49 mm), naked batteries having the same size and a plurality of naked batteries (55×70×30 mm 135×65×20 mm) installed together in a resin case are used as Ni-Cd batteries for private use.

When the Ni-Cd batteries having the relatively small size are processed in order to collect cadmium according to the above described method, the opening has to be made in each battery. However, the Ni-Cd batteries have different shapes from each other. Therefore, one has to spend much time for a head-end process and it is difficult to utilize the above recovery method in a practical manner.

According to the above method, when cadmium is volatilized, impurities such as other components in a battery and material of an outer shell of the battery, particularly resin material of a resin packaging case, are recovered together with cadmium. Therefore, it is a problem that the purity of collected cadmium is reduced. If Fe is included in the collected cadmium as impurity and the cadmium is used as an anode electrode of a Ni-Cd battery, iron ions are produced during the charging cycle and the iron ions are transferred to the cathode electrode so that the capacity of the cathode electrode is reduced and self-discharge becomes large.

In addition, regarding as a used packaged battery, the battery is packaged in a stiff and shock resistant plastic resin case so that it is difficult to separate a battery body from the package.

Conventionally, there is a method for separating the battery body from the plastic case (package) by adding load on a packaged battery. However, in the method, it is very difficult to separate the battery body from the case without damaging the battery body, since the case is made of superior shock resistant plastic resin, for example, ABS resin, polycarbonate resin and so on.

Even if the packaged battery can be crushed and separated, there still exists a problem. It is the problem that cadmium is leaked from the battery and attached to the case. Additional cost is necessary to collect leaked and attached cadmium and clean the case.

As described above, in the conventional method for processing used packaged batteries, it is necessary to consider environmental pollution control systems for leaked material of an electrode caused by damaging an inside structure of the battery during mechanical processing.

A purpose of the present invention is to provide a method for separating a battery body from a resin case efficiently and processing the battery in order to recover high purity cadmium from a large number of used batteries having different sizes.

SUMMARY OF THE INVENTION

The first characteristic of the method for processing a used battery according to the present invention is to immerse the used packaged battery in which a battery body is packaged in a plastic case into a heated liquid medium in a first stage in a non-oxidizing atmosphere to separate the battery body from the plastic case for recovering cadmium.

In a method for recovering cadmium from a used nickel-cadmium battery, the second characteristic of the method for processing a used battery according to the present invention is to thermally treat a naked nickel-cadmium battery and/or a plurality of naked batteries packaged with a plurality of resin cases packaged in a plurality of resin cases at 400° to 600° C. in a non-oxidizing atnisogere as a first heat treatment to remove volatilizable material and then to thermally treat the volatilizing material at 800° to 1000° C. in a non-oxidizing atmosphere as a second heat treatment to recover cadmium by volatilizing the cadmium.

The third characteristic of the method for processing a used battery according to the present invention is to immerse a used packaged battery in which a battery body is covered with a plastic case into a heated liquid medium to separate the battery body from he plastic case, to thermally treat the separated naked battery at 400° to 600° C. in a non-oxidizing atmosphere to remove volatilizable material as a first heat treatment and then to heat the volatilizable material at 800° to 1000° C. in a non-oxidizing atmosphere as a second heat treatment in order to recover cadmium by volatilizing the cadmium.

According to the present invention, the battery body can be efficiently separated from the plastic case by immersing the used packaged battery in a heated liquid medium so that high purity cadmium can be recovered. The present invention does not require forming an opening at each used Ni-Cd battery as in the conventional method. Various naked batteries having different sizes and batteries packaged with resin case can be efficiently processed by thermally treating at 400° to 600° C. in a non-oxidizing atmosphere as the first heat treatment. Further, the impurity compounds such as C, S, Fe, Ni and so on are removed in order to volatilize in the first heat treatment so that high purity cadmium can be recovered.

If the first-stage heat treatment is carried out in air at 400° to 600° C., there is a danger of ignition because the plastic covering of the battery or its decomposition products are in a high-temperature atmosphere, resulting in a violent reaction and leading to an explosion. Therefore, this treatment in the embodiment was of course carried out in a non-oxidizing atmosphere. This is a natural requirement, and it is clearly described that the processing should be carried out in a non-oxidizing atmosphere, preferably with an $O_2$ concentration of 2% or less, to assure stable an safe operation over an extended period of time.

DETAILED DESCRIPTION OF THE INVENTION

It will explain the content of the present invention.

In the present invention, it is preferable that the heated liquid medium is an oil having low viscosity, non-soluble and repulsive characteristics with respect to a plastic case used as an outer shell of a packaged battery body. It is preferable that the temperature is from 180° to 220° C. If the temperature is less than 180° C., a long time is needed to soften the plastic case and separate the battery body from the plastic case. On the other hand, if the temperature is more than 220° C., it requires an expensive liquid medium and a bad smell is produced.

Judging from the above points, the oil, particularly vegetable oil, is suitable for the heated liquid medium. Although the above heated liquid medium is useful to separate the battery body in a static condition, it is more useful that the heated liquid medium be used in an active condition by vibrating and/or stirring the liquid medium.

In the specification, it may be specified that "a battery" is packaged with a plastic case made of ABS resin or polycarbonate (PC) resin and it is impossible to recharge after using the battery for a long time as one of examples of an used battery or a used battery, such as Ni-Cd battery accumulator type.

Figure 1:
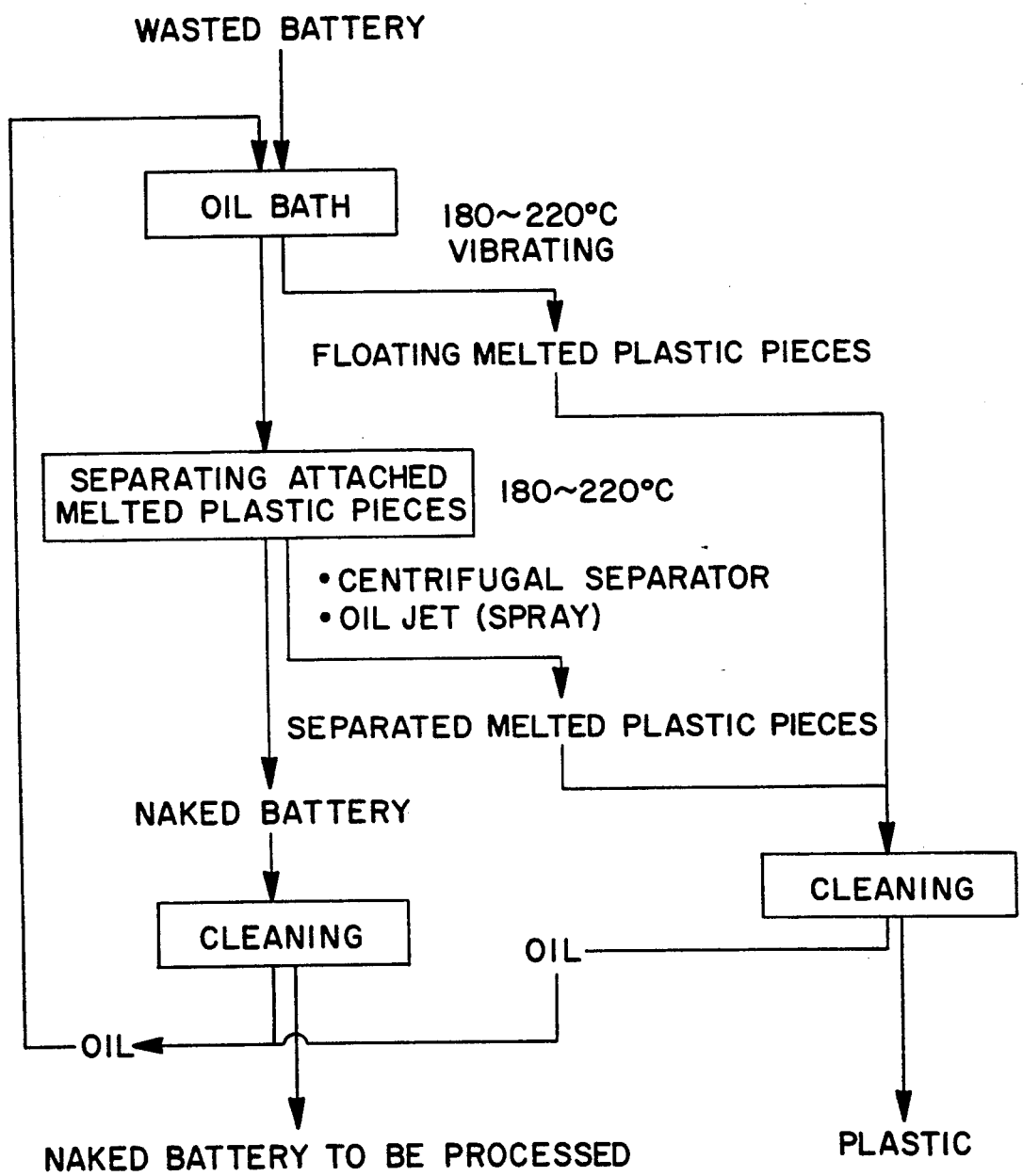
FIG. 1 shows a flow chart of processing a used packaged battery.

It will be explained by one example of a process of the used packaged battery in the vegetable oil as the heated liquid medium with reference to a flow chart as shown in FIG. 1.

The used packaged battery is immersed into an oil bath in which the vegetable oil is heated at 180° to 220° C. (step 1). The plastic package is divided into several pieces in the vegetable oil and the divided pieces are floating in the oil or attached to a battery body (step 2). Floating materials in the oil bath are collected together and processed as plastic material (step 3). Solvated plastic pieces attached to the battery body are separated from the battery body by a centrifugal separator and/or oil jet (spray) and then the plastic pieces are collected together and processed as plastic material the same as in step 3 (step 4). The battery body is washed and then the naked battery is processed along a conventional processing method (step 5). The oil is recovered and the oil is used again (step 6).

In the next, there is explained a system for processing the used packaged batteries.

Table 1 shows melting point and specific gravity of ABS resin and polycarbonate (PC) resin used as a plastic case for a packaged battery, respectively. Although the material of the plastic case has a specific gravity which is greater than the specific gravity of vegetable oil as the heated medium (0.91), the plastic pieces are floating in a range of some temperature of the heated medium.

It is considered that such phenomenon is caused by gas production and gas entrainment simultaneously with cubical expansion of the plastic material while the plastic case is softened.

TABLE 1

| Material of resin case | melting and softening point | specific (25° C.) gravity |
|---|---|---|
| ABS resin | 95 to 115° C. | 0.91 to 1.10 |
| polycarbonate | 150 to 230° C. | 1.20 |
| specific gravity of vegetable oil | | 0.91 (measured) |

As described above, the plastic case is softened and the case is divided into several pieces by immersing the used packaged battery into the heated medium. The divided plastic pieces are peeled off from the battery body and floating in the medium. On the other hand, the battery body sinks, so that the battery body and the plastic material are separated.

Depending on the material of the plastic case, for example, polycarbonate, the plastic pieces are once floated on an upper surface of the heated liquid medium and then sink.

Thus, it happens on occasion that the plastic pieces are mixed into sunken material together with the battery body. In this case, the sunken plastic pieces can be separated from the battery body by the following method. Since the plastic case is divided to the small plastic pieces, a. Plastic pieces are floated by introducing air bubbles from a lower portion of the oil bath, or b. The plastic pieces and a battery body are separated by a centrifugal separator, or c. Small plastic pieces are divided by vibrating a metal-mesh duckboard.

In the following, there is explained a method for recovering cadmium according to the present invention comprising two step heat treatments as described as follows.

Herein, used batteries may be specified as naked batteries having different sizes and/or packaged batteries with plastic resin case in which a plurality of naked batteries are installed into a plurality of the plastic resin cases and a combination thereof.

When the used Ni-Cd batteries are heat treated at 400° to 600° C. in a non-oxidizing atmosphere in the first heat treatment, a sealed portion of the battery is solved and then an opening for exposing cadmium is formed. That is, the first heat treatment corresponds to the step of forming an opening of the battery in a conventional art. Accordingly, in the present invention, volatile components in an outer skin of the used Ni-Cd battery, a resin case and electrolyte compounds are removed at oil temperature of 400° to 600° C. Melting point of such volatile components are less than 600° C. and some components are volatilized by steam pressure of the other components. These volatile components are impurities for cadmium. Therefore, it is preferable to remove them in this stage. Judging from the above condition, it is preferable to spend 2 to 4 hours for the first heat treatment.

It is considered that the compounds of S and C and chloride of Fe and Ni are removed as volatile components in the first heat treatment. Therefore, it is not preferable to discharge the volatile components. It is preferable to discharge the volatile component after a burning step.

If the first heat treatment is operated under 400° C., it is insufficient to remove impurities. If the first heat treatment is done above 600° C., volatile loss of the cadmium becomes large.

In the present invention, the second heat treatment is operated after the first heat treatment and the second heat treatment may be continuous after the first heat treatment or it may operated batchwise.

The second heat treatment may be done in a non-oxidizing atmosphere, for example, nitrogen, gas. Generally, in a case of a cadmium electrode, the cadmium is volatilized under a reducing atmosphere by adding a reducing agent. In the present invention, it is necessary to add a reducing agent in order to produce the reducing atmosphere, because discharged reactive product, hydrogen gas and cracked gas for organic substances utilized as a binder of the electrode, C, H, would have a reducing effect. Of course, it may be operated in the atmosphere of CO gas. However, the purity of recovered cadmium is not so different. Therefore, it is enough to be operated in the atmosphere of nitrogen gas, which is easily and economically produced.

In the second heat treatment, it is preferable to be operated at the temperature in a range of 800° to 1000° C., preferably, 900° to 1000° C. for 3 to 5 hours. If the temperature is less than 800° C., it is not enough to volatilize cadmium. On the other hand, if the temperature is over 1000° C., there is no effect to improve the cadmium volatilizing ratio and it is possible to include other compounds having a high boiling point.

Figure 3:
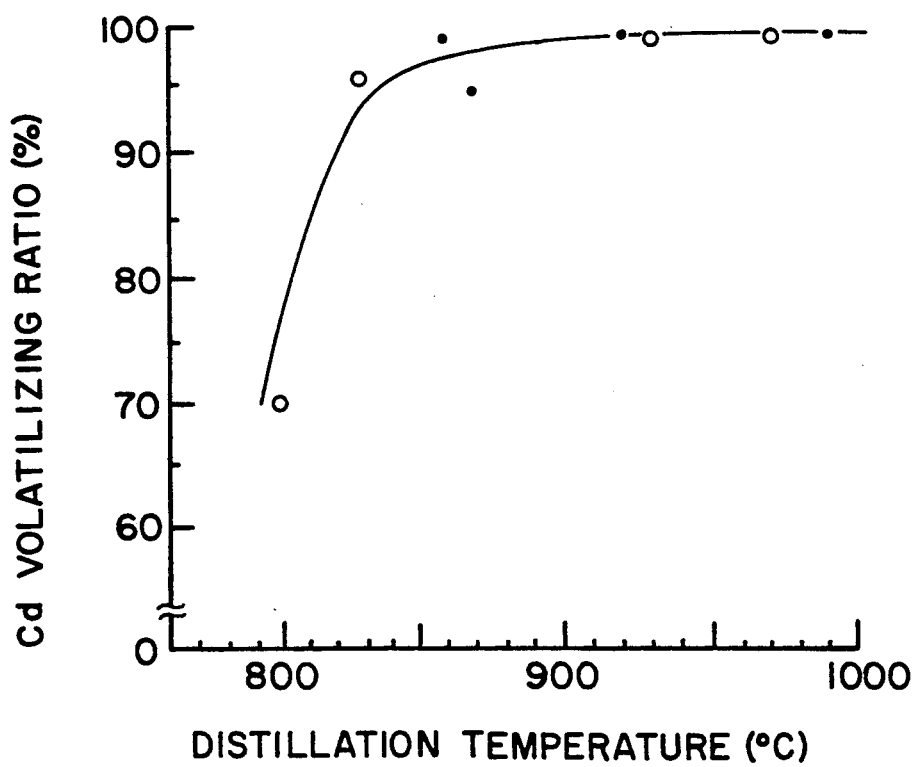
FIG. 3 is a graph showing a relation between cadmium volatilizing ratio and distillation temperature.

FIG. 3 shows the relation between cadmium volatilizing ratio and steam temperature. In FIG. 3, the volatilizing ratio becomes almost 100% in a range of the point above 900° C. At nearly 1000° C., the volatile is saturated.

Although the volatilized cadmium in the second heat treatment may be recovered by condensing as metallic cadmium, it is preferable that the volatilizing gas be discharged after a burning step.

Although Fe and Ni are included in chloride compounds having low boiling point, impurities having high boiling point, such as Fe and Ni can be removed as described above.

In the next, the present invention will be described with reference to FIG. 2.

Figure 2:
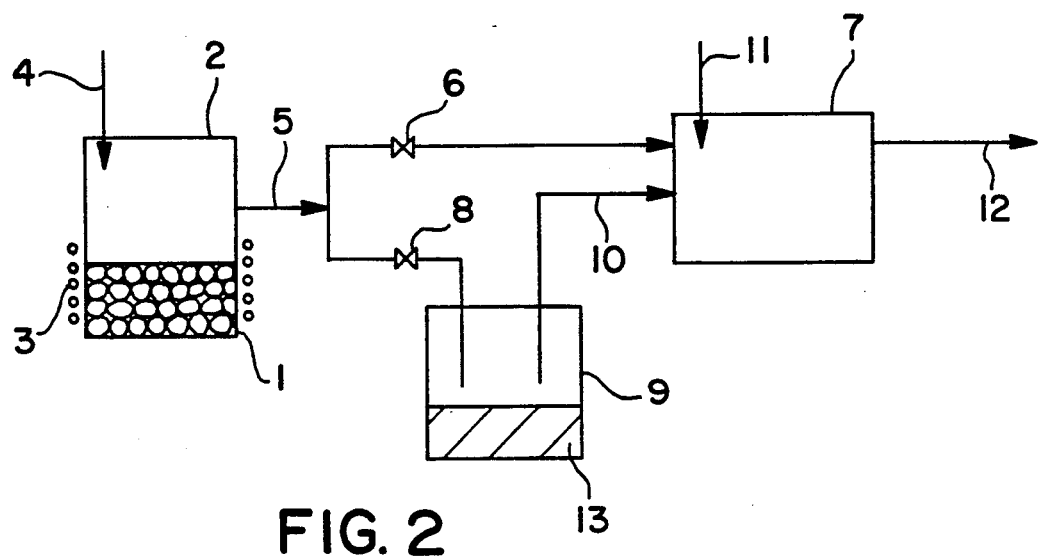
FIG. 2 shows a block diagram showing one embodiment of a system for recovering cadmium according to the present invention.

FIG. 2 shows a basic structure of a cadmium recovering system according to the present invention. In FIG. 2, numeral 1 means a used Ni-Cd battery and numeral 2 means a volatilizing furnace for heat treatment. In the volatilizing furnace, a heating element 3 and an opening for introducing carrier gas 4 are provided. A discharging pipe 5 connected to the volatilizing furnace 2 is divided into two branches. One branch is connected to an after-burning furnace 7 through a first valve 6. Another branch is connected to a cadmium condensing furnace 9 through a second valve 8. A discharging pipe 10 provided at the cadmium condensing furnace 9 is connected to the after-burning furnace 7. A burner 11 and a combustion gas discharging pipe 12 are provided at the after-burning furnace.

To recover cadmium in the above system, the used Ni-Cd battery 1 as starting material is inserted into the volatilizing furnace 2. The first valve is opened and the second valve 8 is closed. LPG gas and air are introduced into the burner 11 in the after-burning furnace 7 and the flame is burned in the volatilizing furnace 2 at 400° to 600° C. for three hours. Thereby, a sealing portion of the used Ni-Cd battery is melted and volatile material is burned in the after-burning furnace 7 and then discharged from the combustion gas discharging pipe 12 to open air as burned gas.

Then, when the second valve 8 is opened and the first valve 6 is closed, non-oxidizing gas, for example, nitrogen gas is introduced into the opening for introducing carrier gas 4 and the temperature in the volatilizing furnace 2 is increased to 800° to 1000° C. Thereby, cadmium can be volatilized and introduced into the cadmium condensing furnace 9. Then, the cadmium is condensed in the cadmium condensing furnace 9 to produce metallic cadmium 13. Discharged gas from the cadmium condensing furnace 9 is burned at the after-burning furnace 7 and the burned gas is discharged from the combustion gas discharging pipe 12 to the open air.

Figure 4:
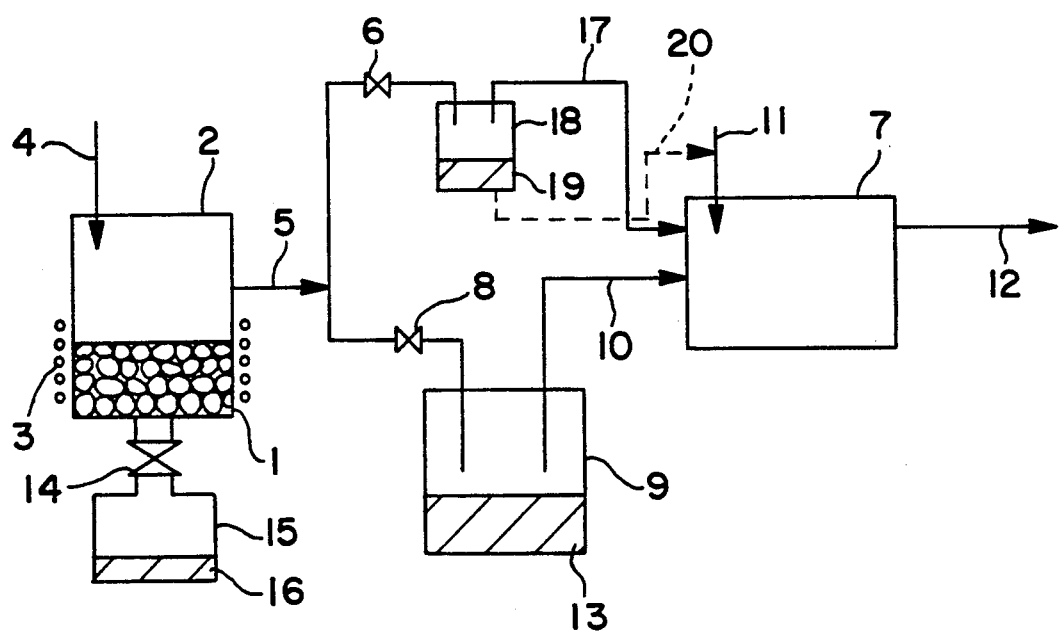
FIG. 4 is block diagram showing a second embodiment of a system of the invention.

In FIG. 4, in the vaporization furnace 2, while vaporizing the volatile constituents, liquid constituents are taken out in the form of the liquid 16 from the vaporization furnace 2 to the tank 15 which eliminates the need for heating to vaporize the liquid constituents, providing a reduction in heat treatment time. Thus, this is a method to remove the resin constituents in the form of a liquid rather than decomposing it into volatile constituents. Free falling, vibration, centrifugal force or the like may be utilized to remove the liquid constituents and the application of a vibration or centrifugal force facilitates passing of the liquid.

The volatile constituents vaporized from the vaporization furnace 2 are cooled by a cooling trap 18 disposed in a duct 17 and part of the constituents are recovered as a liquid 19. The recovered liquid 19 can be used as a fuel for a burner 11 of the after-burning furnace 7 through a pipe 20. As a result, part of the volatile constituents can be effectively used as a fuel for the after-burning furnace, thereby reducing the fuel consumption of the burner 11.

DETAILED DESCRIPTION OF PREFERRED EMBODIMENTS

The present invention will be explained with reference to the following embodiments.

(Embodiment 1)

A packaged battery, in which eight batteries of size AA are packaged in a plastic case made of ABS resin and polycarbonate, respectively, is thrown into an oil bath in which vegetable oil (specific gravity 0.91) is heated at 180° C., 220° C. and 250° C., respectively for 60 minutes. Table 2 shows melting and softening condition of each plastic material at the respective temperatures.

In a case made of ABS resin, the ABS resin is softened at 180° to 250° C. after few minutes. By stirring the oil bath, the plastic material is separated from the battery body. Separated plastic pieces are shrunk and these become small lumps floating on the upper surface of the vegetable oil. The higher the temperature of the vegetable oil becomes, the more the plastic material is softened. However, the ABS resin is not melted at the temperature 250° C. of the vegetable oil.

In a case made of polycarbonate, the polycarbonate is softened at 200° C. to 250° C. after a few minutes and the plastic case is separated from the battery body by stirring the oil bath.

Separated polycarbonate pieces are floating on the upper surface of the oil and then the pieces are sunk in the oil bath after a long time. It is necessary to remove the polycarbonate pieces while the pieces are floating.

TABLE 2

| Temperature | |
|---|---|
| [ABS resin] | |
| 180° C. | Resin is softened after one minute. By stirring the oil after 5 minutes, the resin is separated from the battery body. |
| 220° C. | Resin is immediately softened after immersing into oil. The oil is stirred after one minute and then the resin is separated from the battery body. |
| 250° C. | Resin is immediately softened after immersing into oil. The oil is stirred after one minute and then the resin is separated from the battery body. Little smoke is produced with bad smell. |
| [Polycarbonate] | |
| 220° C. | After one minute, the resin is softened. The oil is stirred after 5 minutes, the resin is separated from the battery body and the separated resin pieces are floating for some minutes. |
| 250° C. | Resin is softened immediately after immersing into oil. By stirring the oil. after two minutes, the resin is separated from the battery body and separated pieces are floating. The floating pieces are sunk again after some minutes pass. Little smoke is produced with bad smell. |

(Embodiment 2)

Ten used Ni-Cd batteries 1 as starting material of size D, Size C and size AA, respectively were used. Cadmium in a total of thirty batteries was recovered by the system as shown in FIG. 2. Oil was heated at 400° C. for three hours as the first heat treatment in a non-oxidizing atmosphere and the oil was heated at 900° C. for four hours in a nitrogen atmosphere as the second heat treatment.

(Embodiment 3~6)

The first heat treatment and the second heat treatment temperature was changed as shown in Table 3, respectively. The other conditions were the same as the second embodiment. Under the above conditions, cadmium is recovered.

(Embodiment 7)

Ten used resin packaged batteries were used as the starting material and the first heat treatment temperature was changed to 500° C. The other conditions were the same as the second embodiment. Cadmium was recovered under the above conditions.

(Embodiment 8)

15 naked batteries (5 batteries of size D, 5 batteries of size C and 5 batteries of size AA) and 5 resin package batteries were used as the starting material. The condition of the eighth embodiment were the same as the conditions of the second embodiment except the first heat treatment was changed to 500° C.

(Embodiment 9)

Resin packaged batteries the same as the batteries used in the seventh embodiment were inserted into an oil bath in which vegetable oil was heated at 180° C. to separate the packaged resin from the battery so that the naked batteries appeared.

The naked batteries were heat treated at 400° C. for three hours as the first heat treatment and then heat treated at 900° C. for four hours in nitrogen gas as the second heat treatment in order to recover cadmium.

(Comparisons 1 through 2)

As a comparison, the first heat treatment war omitted in the first comparison. The first heat treatment temperature was selected at 200° C. in the second comparison. The condition of comparisons were the same as the condition of the second embodiment except the above described differences.

Recovered cadmium purity in the embodiments 1 through 7 and the comparisons 1 and 2 is shown in Table 3, respectively.

As shown in Table 3, it can be recognized that impurity in recovered cadmium can be reduced by the first heat treatment at 400° C. to 600° C. in a non-oxidizing atmosphere according to the present invention so that high purity cadmium metal can be recovered.

TABLE 3

| | starting material | | 1st heat treatment | 2nd heat treatment | purity of recovered cadmium (%) | | |
|---|---|---|---|---|---|---|---|
| | naked battery | resin battery | (°C.) × 3 hr | (°C.) × 4 hr | Cd | Fe | Ni |
| Embodiment 2 | o | | 400 | 900 | 99.8 | .003 | .002 |
| Embodiment 3 | o | | 500 | 900 | 99.9 | .001 | .001 |
| Embodiment 4 | o | | 600 | 900 | 99.9 | .001 | .001 |
| Embodiment 5 | o | | 500 | 800 | 99.9 | .001 | .001 |
| Embodiment 6 | o | | 500 | 1000 | 99.9 | .001 | .001 |
| Embodiment 7 | | o | 500 | 900 | 99.9 | .001 | .001 |
| Embodiment 8 | o | o | 600 | 900 | 99.9 | .001 | .001 |
| Embodiment 9 | o | o | 400 | 900 | 99.9 | .001 | .001 |
| Comparison 1 | o | | — | 900 | 99.5 | .021 | .033 |
| Comparison 2 | o | | 200 | 900 | 99.6 | .018 | .032 |

(Embodiment 10)

The first-stage heat treatment and volatile constituent removal were performed under the conditions shown in Table 4.

(Conditions)

(1) Tests 1-3 are those cases where the first-stage heat treatment temperature was varied in temperature at 450° C., 500° C. and 550° C., respectively.
(2) Tests 4 and 5 are those cases where the volatile constituents were taken out in liquid form from furnace 2 and part of the constituents were trapped.
(3) Tests 6-8 were those cases where combinations of volatile constituent processing methods were used.

As can be seen from Table 4, it is possible to achieve a considerable reduction in processing time. Tests 5-8 used trapped liquid as fuel for the after-burning furnace, thereby achieving a reduction in fuel consumption of the burning furnace.

TABLE 4

| No. | Raw material | First-stage heating temp. | Volatile constituent distribution (%) | | | First-stage heating time ratio* |
| --- | --- | --- | --- | --- | --- | --- |
| | | | Taken out | Partly trapped | After burning furnace | |
| 1 | Resin packed battery | 450 | 0 | 0 | 100 | 100 |
| 2 | | 500 | 0 | 0 | 100 | 70 |
| 3 | | 550 | 0 | 0 | 100 | 60 |
| 4 | | 500 | 35 | 0 | 65 | 40 |
| 5 | | 500 | 0 | 40 | 60 | 70 |
| 6 | | 450 | 35 | 30 | 35 | 60 |
| 7 | | 500 | 35 | 25 | 40 | 40 |
| 8 | | 550 | 35 | 15 | 50 | 30 |

*Processing time ratio when that of Test 1 is assumed as 100.

Various modifications of the methods of the invention may be made without departing from the spirit or scope thereof and it is to be understood that the invention is intended to be limited only as defined in the appended claims.

What we claim is:

1. A method for recovering cadmium from a used nickel-cadmium battery comprising heating at least one member of the group consisting of a nickel-cadmium naked battery a plurality of nickel-cadmium naked battery bodies encased in a resin case in a non-oxidizing atmosphere at 400° to 600° C. in a first stage to remove volatile constituents and then heating the battery bodies a non-oxidizing atmosphere at 800° to 1000° C. in a second stage to vaporize the cadmium and recovering the cadmium.

2. The method of claim 1 wherein the non-oxidizing atmosphere in the first-stage heating has an oxygen concentration of 2% or less.

3. The method of claim 1 wherein volatile constituents are removed by vaporization of the constituents.

4. The method of claim 1 wherein volatile constituents generated in the first-stage heat treatment are removed in both a heat melting stage and a vaporization stage.

5. The method of claim 1 wherein volatile constituents generated in the first-stage heat treatment are removed while trapping part of the volatile constituents.

6. The method of claim 1 wherein volatile constituents generated in the first-stage heat treatment are removed in a heat melting stage and by trapping part of the constituents.

7. The method of claim 5 wherein trapped extracts are used as a fuel for an after-burning furnace.

8. The method of claim 6 wherein trapped extracts are used as a fuel for an after-burning furnace.

9. A method for processing a used packed battery body encased in a plastic case comprising immersing the encased battery body into a heated liquid medium, separating the plastic case from the battery body, heat treating the separated naked battery in a non-oxidizing atmosphere at 400° to 600° C. in a first-stage to remove volatile constituents, and then heat treating the battery body in a non-oxidizing atmosphere at 800° to 1000° C. in a second-stage to vaporize cadmium therefrom and recovering the cadmium.

10. The method of claim 9 wherein the heated liquid medium is a vegetable oil.

11. The method of claim 9 wherein the temperature of the heated liquid medium is 180° to 220° C.

12. The method of claim 9 wherein after the used packaged battery is immersed in the heated liquid medium, the medium is stirred.

13. The method of claim 9 wherein after the used packaged battery is immersed in the heated liquid medium, sedimented members are post-treated.

* * * * *